Sept. 8, 1964  N. I. BOHLIN  3,147,995
SAFETY BELT DEVICE FOR VEHICLES
Filed June 27, 1963  2 Sheets-Sheet 1
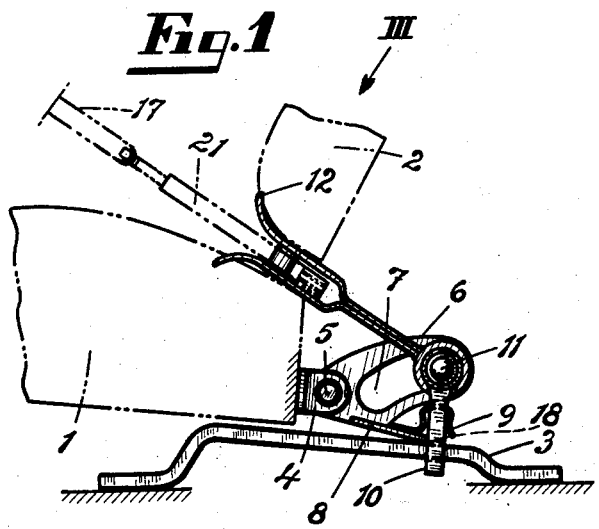
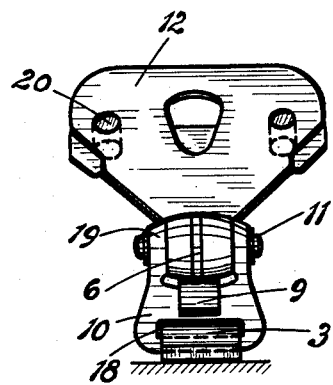
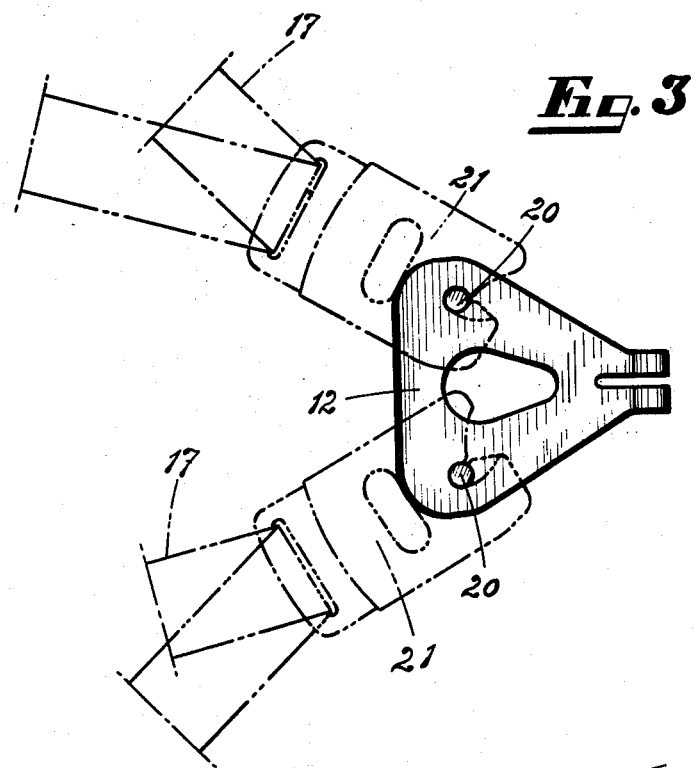
INVENTOR
Nils Ivar Bohlin
BY Pierce, Scheffler & Parker
ATTORNEYS

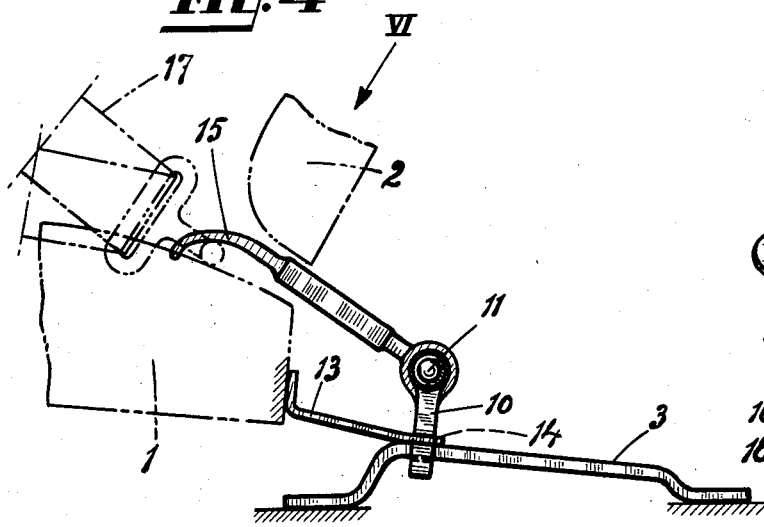
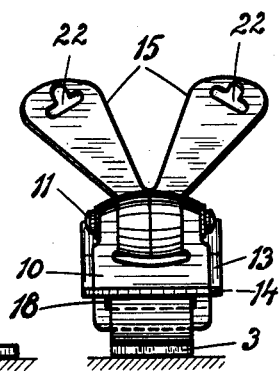
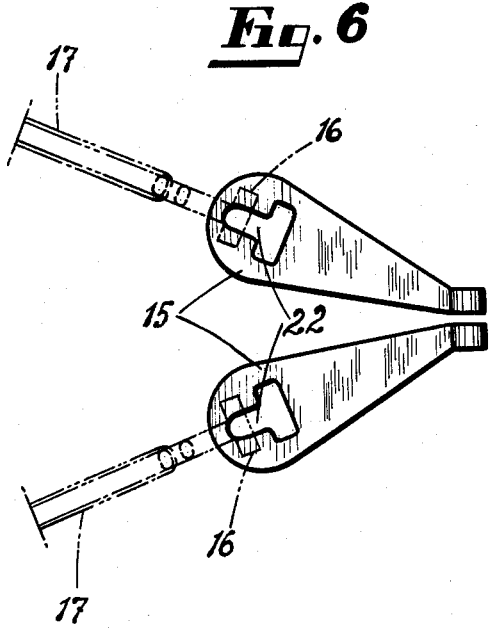
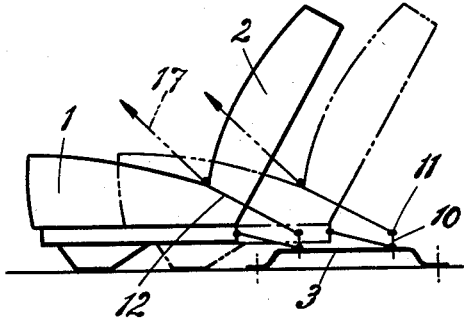
INVENTOR
Nils Ivar Bohlin

United States Patent Office 3,147,995
Patented Sept. 8, 1964

3,147,995
SAFETY BELT DEVICE FOR VEHICLES
Nils Ivar Bohlin, Goteborg, Sweden, assignor to Aktiebolaget Volvo, Goteborg, Sweden, a corporation of Sweden
Filed June 27, 1963, Ser. No. 291,183
6 Claims. (Cl. 297—385)

The present invention relates to a safety belt device for vehicles, especially road vehicles, having displaceable seats or chairs.

This application is a continuation-in-part of my pending application for Safety Belt Device for Vehicles, Serial No. 148,101, filed October 27, 1961 now abandoned.

A type of safety belt now conventional comprises a belt which extends obliquely over the chest of the passenger and its upper end is secured to the body or frame of the vehicle and at its lower end is detachably connected with a floor mounting provided on the other side of the passenger. The chest belt may also be combined with a hip belt which extends from said floor mounting to another floor mounting provided on the same side as the upper mounting. In belts of this type, such as disclosed in my prior United States Patent No. 3,043,625 granted July 10, 1962, it is important from a physiological point of view that the ramification point of the chest and hip belts, which point often is located near the lock of the belt, orientate the hip belt such as to lie over the hip of the strapped person and also fix it in a manner such as to prevent the hip part of the belt from slipping upwards over the soft parts of the abdomen when a load is exerted on the belt. Further, the lock of the belt or belts must be easily accessible and preferably located such as not to bear on the body of the strapped person. Consequently, a suitable location is as close as possible to the floor mounting.

In the case of a seat of the bench type wherein the belt has to be slipped through a clearance between the seat and the backrest of the seat the lock is consequently suitably located immediately ahead of this clearance. However, the front seat is usually adjustable longitudinally of the vehicle, resulting in a change of the position of the lock relative to the seat upon forward or rearward displacement of the seat.

In common with my said pending application the object of the present invention is to provide a device which ensures that the lock always assumes the same position relative to the seat irrespective of the position of the seat.

A further object of the invention is to provide a device comprising a guiding means secured to the floor of the vehicle and a mounting displaceably guided on said guiding means and attachable to said seat, said mounting being secured to the seat and movable therewith during adjustment of the seat and being automatically lockable to said guiding means in all adjusted positions of the seat.

Still further objects of the invention will become apparent when considered together with the accompanying drawings, in which FIG. 1 is a lateral view of a mounting according to the invention and a seat in its rearmost adjusted position, FIG. 2 is a view of the mounting seen from the right in FIG. 1, FIG. 3 is a partial top plan view in the direction of the arrow III of FIG. 1, FIG. 4 is a lateral view of a mounting of a modified construction with the seat in a forward adjusted position, FIG. 5 is a view corresponding to FIG. 2 of the mounting in FIG. 4, FIG. 6 is a partial top plan view of the mounting in the direction of the arrow VI of FIG. 4 and FIG. 7 is a diagrammatic view of a seat in two adjusted positions.

Numeral 1 denotes a seat which is movable forward and rearward on guide members in a vehicle, and numeral 2 denotes the backrest of the seat. A strong bar 3 is secured to the floor below and behind the seat 1 in the central part of the vehicle. Attached to the rear side of the seat 1 above the bar 3 is a fastening member 4 having a horizontal pivot 5 on which is pivotally mounted an anchoring and carrier member which consists of a vertical plate 6 with an arcuate slot 7 and a substantially horizontal plate 8 the end of which is resting on the bar 3. On the upper side of the last-named plate 8 there is fastened a bent leaf spring 9 or similar member.

A mounting 10 is provided with an opening 18 through which the bar 3 is threaded. The mutual dimensions of the opening 18 and the cross section of the bar 3, respectively, are such that the mounting 10 with clearance can slide along the bar 3 when the mounting 10 is in a position substantially at right angles to the bar 3 but if the mounting 10 is tilted it will grip the bar firmly so as to be locked in any position along the bar. The plate 8 is in contact with one side of the mounting 10 in close proximity to the bar 3 and when tilted the mounting will swing around said contact point. The spring 9 extends through an opening in the mounting 10 and bears on the other side thereof such that the mounting will be maintained in the position at right angles to the bar 3 and normally will be freely displaceable and carried along the bar 3 in one direction by means of the plate 8 and in the other direction by means of the spring 9 upon movement of the seat 1.

At a distance from the bar 3 the mounting 10 has a lug 19 for a pivot bolt 11 which when the mounting is tilted is free to move in the slot 7 of the plate 6. Mounted pivotally on the pivot bolt 11 is a fastening member 12 having a tap 20 for connection with the lock plate 21 of a safety belt 17.

In case of a substantially forward pull on belt 17 and thus on the member 12 the mounting 10, due to its clearance relative to the bar 3, can be slightly tilted about the contact point of the plate 8 with the spring 9 yielding at the same time. The shape of the slot 7 is such that the pivot bolt 11 can move freely therein. As mentioned above, the mounting 10 will then be locked in its position, and at the same time the seat 1 will be anchored even in case of fracture of the normal fastening members of the seat, forward movement of the seat being prevented due to its connection with the locked mounting 10 via the parts 4, 5, 6 and 11.

Due to the fact that the mounting 10 always assumes the same position relative to the seat 1, the member 12 also will have the same position irrespective of the adjustment of the seat.

The embodiment illustrated in FIGS. 4–6 is somewhat simplified. The mounting 10 is in the same way as above described threaded on the bar 3 with a clearance which will allow the mounting 10 to be tilted. The member 13 consisting of a strong metal plate is firmly attached to the back of the seat 1 with the free end located immediately above the bar 3. Said free end of member 13 has an opening 14 surrounding the mounting 10. As described above the mounting 10 has a lug for the pivot bolt 11 and mounted pivotally on said bolt is a fastening member 15 having a T-shaped opening 22 for connection with a cross-pin 16 connected to the belt 17. During displacement of the seat 1 the member 13 will maintain the mounting 10 in a position at right angles to the bar 3 so that the mounting will be in disengaged sliding position but at a pull on the belt said mounting tends to tilt around the contact point between the mounting and the front wall of the opening 14 so that the mounting will be locked to the bar 3.

As will be seen from FIG. 7, the device according to the invention is such that the direction of the pull on the belt 17 and the location of the fastening member relative to the seat 1 are entirely independent of the adjusted position of the seat. It will be obvious that the construction of the details described and illustrated may be modified within the scope of the invention.

What I claim is:

1. For use in a vehicle, especially a road vehicle having a fore and aft displaceable seat, a floor therebeneath and a seat belt for a person occupying the seat, a belt anchoring device comprising a guiding means secured to the floor and a mounting displaceably slidable on said guiding means and attachable to said belt, said mounting being secured to the seat and movable therewith during adjustment of the seat and being automatically lockable to said guiding means in all adjusted positions of the seat.

2. An anchoring device for a seat belt as defined in claim 1 wherein said mounting is releasably connected to said belt and is locked to said guiding means in response to a pull on said seat belt.

3. An anchoring device for a seat belt as defined in claim 1 wherein said mounting is connected to said seat belt at a distance from said guiding means to thereby apply a moment of tilt to said mounting in response to a pull on said seat belt thereby to effect said locking action between said mounting and said guiding means.

4. For use in a vehicle, especially a road vehicle having a seat displaceable longitudinally of the vehicle, a floor therebeneath and a seat belt for a person occupying the seat, a belt anchoring device comprising a guide bar secured to the floor and extending longitudinally of the vehicle, a mounting member upstanding upon said guide bar, said mounting member including at its lower part an aperture through which said guide bar passes and a connection means to the seat belt at the upper part thereof, said mounting member being tiltable in the forward direction in response to a pull exerted thereon by the seat belt to thereby establish a friction lock between said guide bar and the upper and lower edges of the aperture in said mounting member, and means connecting said mounting member and the seat to thereby effect a longitudinal adjustment of said mounting member on said guide bar simultaneously with a longitudinal adjustment in the position of the seat.

5. An anchoring device as defined in claim 4 wherein said connecting means between said mounting member and the seat in constituted by a rigid member extending rearwardly from the seat and said rigid member having an eye which surrounds said mounting member.

6. An anchoring device as defined in claim 4 wherein said connecting means between said mounting member and the seat is constituted by a rigid member extending rearwardly from the seat, said rigid member including an arcuate slot in which is received a pivot pin carried at the upper end of said mounting member for guiding the forward tilting movement of said mounting member, and said rigid member being further connected to said mounting member by a spring member, said spring member serving to maintain said mounting member in a non-tilted position in the absence of any pull thereon by the seat belt thereby to facilitate movement of said mounting member along said guide bar whenever the seat is adjusted.

No references cited.